(12) United States Patent
Mackenzie et al.

(10) Patent No.: US 9,752,542 B1
(45) Date of Patent: Sep. 5, 2017

(54) AIR CLEANER BOX ASSEMBLY

(71) Applicant: GM GLOBAL TECHNOLOGY OPERATIONS LLC, Detroit, MI (US)

(72) Inventors: Steven K. Mackenzie, West Bloomfield, MI (US); Douglas L. Wickham, Troy, MI (US); Steven R. Granke, Livonia, MI (US); Steven L. Williams, Macomb, MI (US); Brian R. Bauer, Davisburg, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/218,470

(22) Filed: Jul. 25, 2016

(51) Int. Cl.
| | |
|---|---|
| *B60K 13/02* | (2006.01) |
| *F02M 35/04* | (2006.01) |
| *F02M 35/02* | (2006.01) |
| *F02M 35/024* | (2006.01) |
| *B62D 25/08* | (2006.01) |
| *B62D 25/12* | (2006.01) |

(52) U.S. Cl.
CPC .......... *F02M 35/048* (2013.01); *B60K 13/02* (2013.01); *B62D 25/082* (2013.01); *B62D 25/12* (2013.01); *F02M 35/0201* (2013.01); *F02M 35/02416* (2013.01)

(58) Field of Classification Search
CPC .... F02M 35/04; F02M 35/048; F02M 35/044; F02M 35/0201; F02M 35/0202; F02M 35/0204; F02M 35/02416; B60K 13/02; B62D 25/082; B62D 25/085; B62D 25/12
USPC ....................................................... 180/68.3
See application file for complete search history.

(56) References Cited

U.S. PATENT DOCUMENTS

| | | | | |
|---|---|---|---|---|
| 8,298,308 | B2 * | 10/2012 | Li | ...................... F02M 35/0203 123/198 E |
| 8,434,580 | B2 * | 5/2013 | Azuma | ................ F02M 35/162 180/291 |
| 8,486,173 | B2 * | 7/2013 | Fikany | .................... B60R 21/34 180/68.1 |
| 9,127,625 | B2 * | 9/2015 | Kaiser | .................... B01D 46/10 |

* cited by examiner

*Primary Examiner* — John Walters
(74) *Attorney, Agent, or Firm* — Quinn IP Law (57) ABSTRACT

A vehicle includes an air cleaner box assembly disposed within an engine compartment. The air cleaner box assembly includes a moveable shell portion and a stationary shell portion. The moveable shell portion includes an upper surface disposed adjacent a hood, and defines a filtered air chamber. The stationary shell portion is attached to a structure, and defines an unfiltered air chamber. A filter element is attached to and supported by the moveable shell portion. The filter element separates the filtered air chamber and the un-filtered air chamber. Each of a plurality of spring loaded guide members slideably connect the moveable shell portion and the stationary shell portion, and guide the moveable shell portion along a path relative to the stationary shell portion, between an expanded position and a compressed position.

19 Claims, 5 Drawing Sheets

AIR CLEANER BOX ASSEMBLY

TECHNICAL FIELD

The disclosure generally relates to an air cleaner box assembly for a vehicle.

BACKGROUND

Vehicles powered by internal combustion engines typically include an air cleaner box assembly. The air cleaner box assembly supports a filter element, and includes an air inlet that supplies a flow of air to an un-filtered air chamber of the cleaner box. The air flows through the filter element to a filtered air chamber of the cleaner box. The filter element filters out particulate matter from the flow of air. The air cleaner box assembly includes an air outlet that directs the flow of air from the filtered air chamber to an intake manifold for use as combustion air.

The air cleaner box assembly is typically located in an engine compartment of the vehicle, underneath and adjacent a hood of the vehicle. The hood may be free to crumple inward and/or downward, into the engine compartment, in response to a force applied onto an exterior surface of the hood. Accordingly, a gap is generally disposed between the hood and the top of the air cleaner box assembly to enable the hood to crumple in response to the external force.

The volume and height of the air cleaner box assembly are key design parameters for ideal air induction performance. A larger volume and/or a greater height of the air cleaner box assembly provides better induction pressure performance, reduces snorkel noise, improves snow ingestion performance, and reduces the need for additional tuning elements to reduce noise. However, the volume and/or height of the air box cleaner assembly are typically limited by the gap between the hood and the top of the air box cleaner assembly.

SUMMARY

An air cleaner box assembly includes a moveable shell portion defining a first air chamber, and a stationary shell portion defining a second air chamber. A filter element is attached to and supported by the moveable shell portion. The filter element separates the first air chamber and the second air chamber. A guide member slideably connects the moveable shell portion and the stationary shell portion. The guide member guides the moveable shell portion along a path relative to the stationary shell portion, between an expanded position and a compressed position.

A vehicle is also provided. The vehicle includes a structure having a hood, and defining an engine compartment. An air cleaner box assembly is attached to the structure, and is disposed within the engine compartment. The air cleaner box assembly includes a moveable shell portion and a stationary shell portion. The moveable shell portion includes an upper surface disposed adjacent to the hood, and defines a filtered air chamber. The stationary shell portion is attached to the structure, and defines an unfiltered air chamber. A filter element is attached to and supported by the moveable shell portion. The filter element separates the filtered air chamber and the un-filtered air chamber. The air cleaner box assembly further includes a plurality of guide members. Each of the plurality of guide members slideably connect the moveable shell portion and the stationary shell portion, and guide the moveable shell portion along a path relative to the stationary shell portion, between an expanded position and a compressed position.

Accordingly, the moveable shell portion may move along the path, from the expanded position, toward the stationary shell portion, into the compressed position, in response to an applied load. Because the moveable shell portion is free to move into the compressed position, the top surface of the moveable shell portion may be positioned adjacent an underside of the hood, within the engine compartment. The hood is able to crumple inward into the engine compartment to dissipate energy, in response to an applied load, because the moveable shell portion is free to move downward, into the compressed position, to provide room for the hood to crumple. Because the top surface of the moveable shell may be positioned adjacent the underside of the hood, without having to leave a significant gap therebetween, a height and volume of the air cleaner box assembly may be maximized within the engine compartment, thereby improving performance of the air cleaner box assembly.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
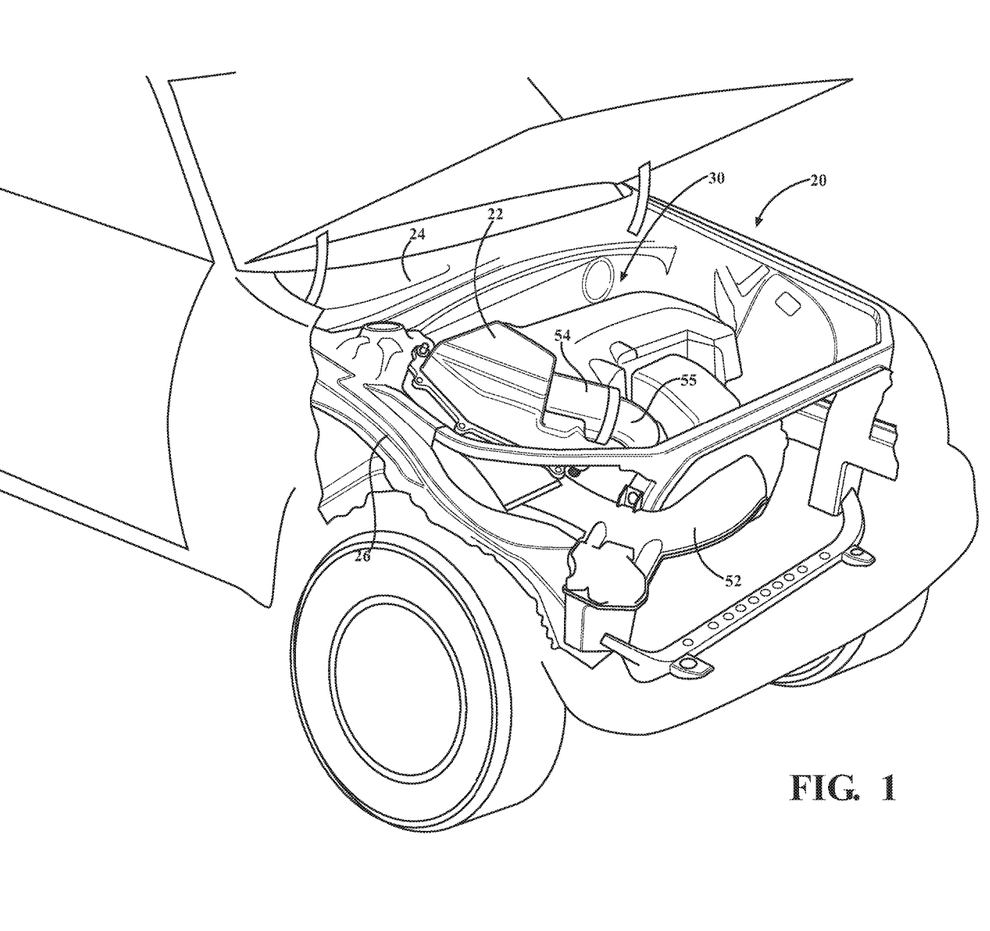
FIG. 1 is a schematic perspective view of a vehicle showing an air cleaner box assembly in an engine compartment of the vehicle.
Figure 2:
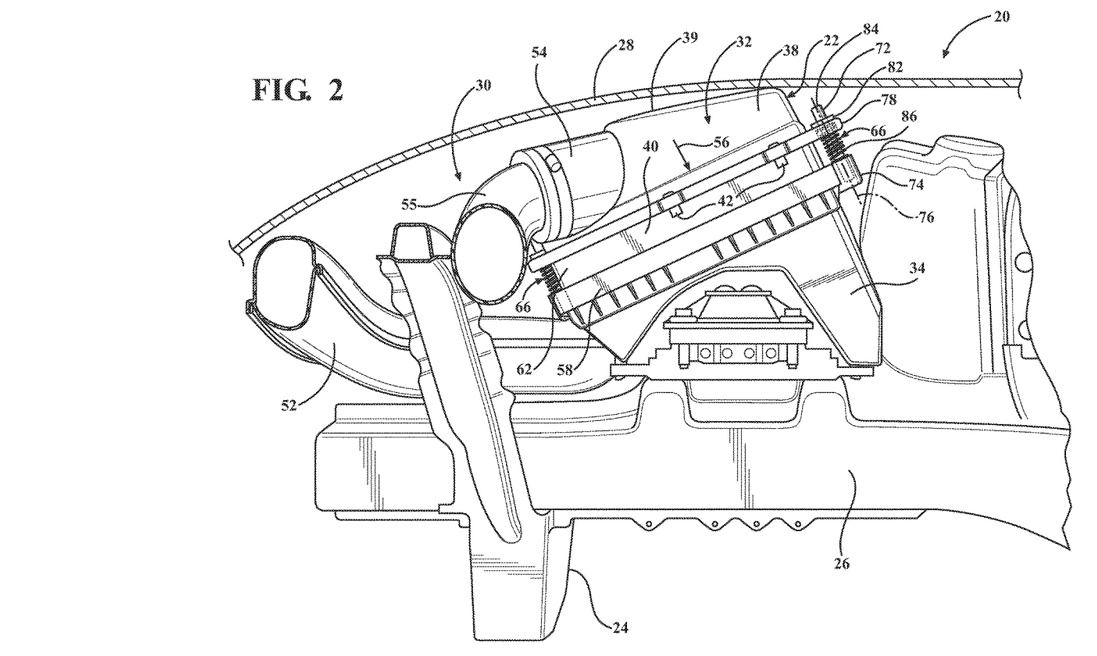
FIG. 2 is a schematic, cross sectional view of the vehicle showing the air cleaner box assembly.

Referring to the Figures, wherein like numerals indicate like parts throughout the several views, a vehicle is generally shown at 20. Referring to FIGS. 1 and 2, the vehicle 20 may include any type and/or style of vehicle 20 that includes an air cleaner box assembly 22 for filtering a flow of air. For example, the vehicle 20 may include, but is not limited to, an automobile having an internal combustion engine that uses a flow of filtered air for combustion. However, it should be appreciated that the vehicle 20 may alternatively include, a tractor, an ATV, a boat, etc.

The vehicle 20 includes a structure 24. The structure 24 may include, but is not limited to, a frame rail 26 or other structural support elements, and may define an engine compartment 30. The term "structure 24" should be interpreted broadly to include several different components that combine to support the various features of the vehicle 20. The structure 24 may further include, for example, one or more body panels, and one or more closure structures, such as a hood 28, which is positioned to cover the engine compartment 30. Accordingly, for the purpose of this disclosure, the hood 28 may be considered part of the structure 24 of the vehicle 20. The specific style and configuration of the structure 24 is not pertinent to the teachings of this disclosure, and are therefore not described in detail herein.

As noted above, the vehicle 20 includes the air cleaner box assembly 22. While the air cleaner box assembly 22 is shown and described herein as part of the vehicle 20, it should be appreciated that the air cleaner box assembly 22 may be incorporated into some other vehicle 20 or some other mechanism not described herein. As shown in the exemplary embodiment described herein, the air cleaner box assembly 22 is attached to the structure 24, e.g., the frame rail 26, and is disposed within the engine compartment 30.

Figure 3:
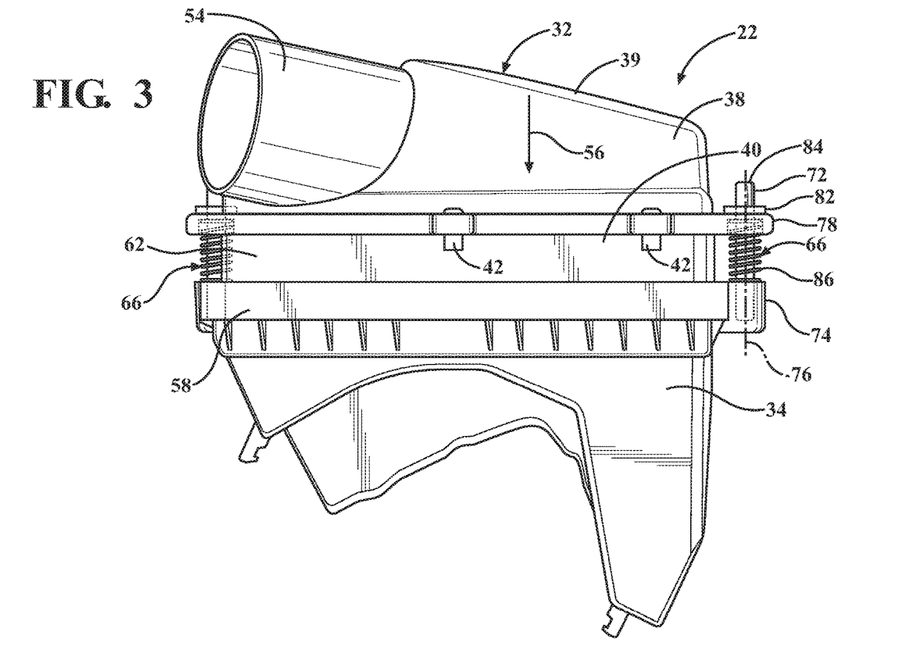
FIG. 3 is a schematic, perspective view of the air cleaner box assembly in an expanded position.
Figure 4:
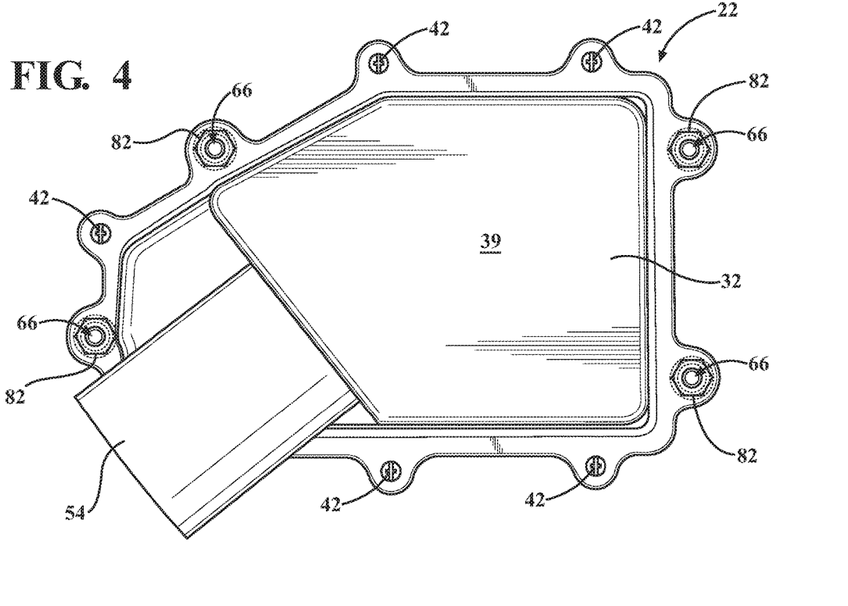
FIG. 4 is a schematic plan view from above of the air cleaner box assembly.
Figure 5:
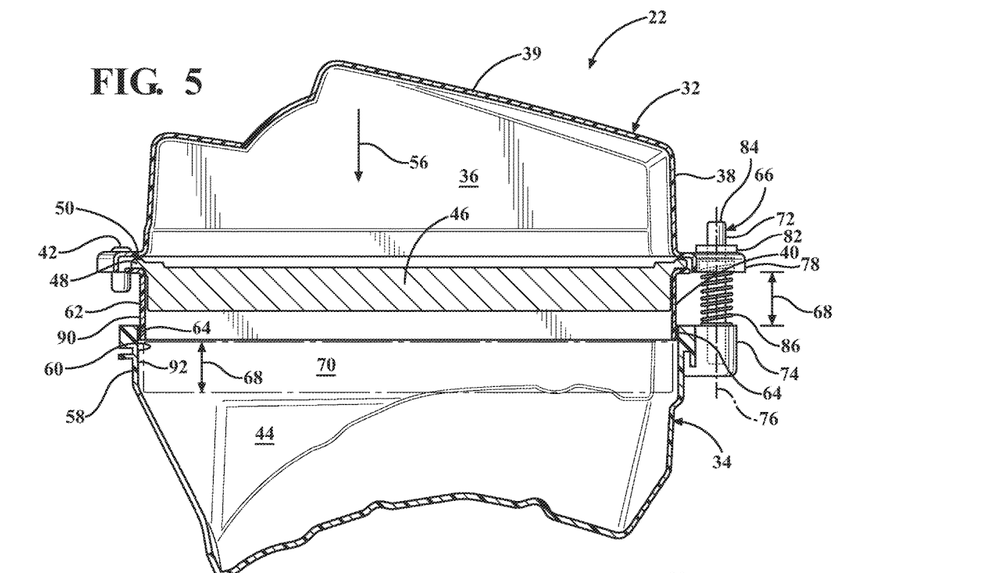
FIG. 5 is a schematic, cross sectional view of the air cleaner box assembly in the expanded position.
Figure 6:
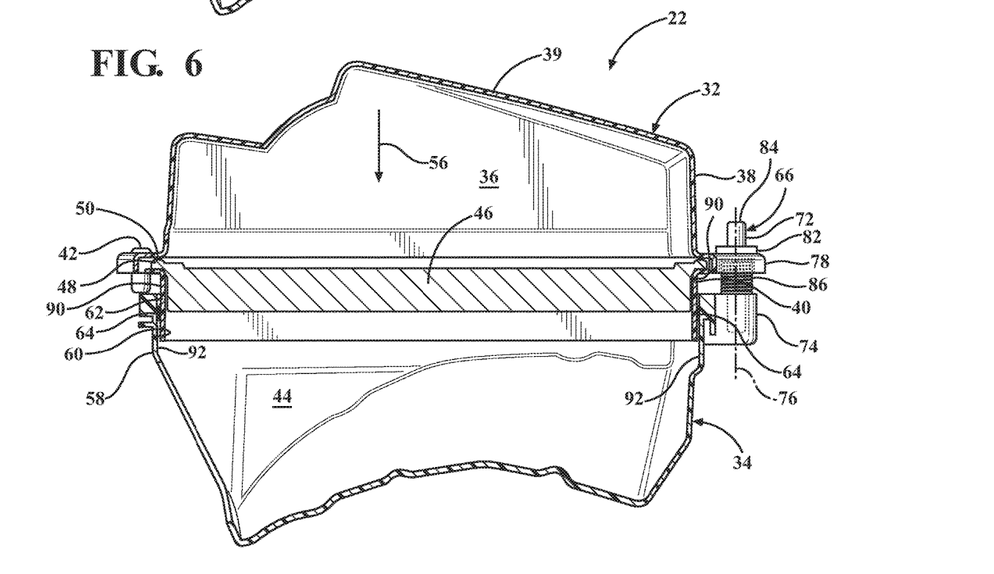
FIG. 6 is a schematic, cross sectional view of the air cleaner box assembly in a compressed position.

Referring to FIGS. 5 and 6, the air cleaner box assembly 22 includes a moveable shell portion 32 and a stationary shell portion 34. The moveable shell portion 32 defines a first air chamber 36. The first air chamber 36 is hereinafter referred to as a filtered air chamber 36. The moveable shell portion 32 includes a first shell portion 38 and a second shell portion 40. The first shell portion 38 may alternatively be referred to as an upper shell portion 38, and the second shell portion 40 may alternatively be referred to as a middle shell portion 40. The upper shell portion 38 is removeably attached to the middle shell portion 40. The upper shell portion 38 may be attached to the middle shell portion 40 in any suitable manner. For example, as best shown in FIG. 3, the upper shell portion 38 may be attached to the middle shell portion 40 via a plurality of fasteners 42 that interconnect the first shell portion 38 and the second shell portion 40. The plurality of fasteners 42 may include, but are not limited to, screws, bolts, push-pins 72, etc. It should be appreciated that the upper shell portion 38 may be attached to the middle shell portion 40 in some other manner not shown or described herein.

Referring to FIGS. 5 and 6, the stationary shell portion 34 defines a second air chamber 44. The second air chamber 44 is hereinafter referred to as an un-filtered air chamber 44. As shown in FIG. 2, the stationary shell portion 34 may be attached to the structure 24, e.g., the frame rail 26. However, it should be appreciated that the stationary shell portion 34 may be attached to some other component of the structure 24, not shown or described herein. In alternative embodiments, the stationary shell portion 34 may be attached to an engine or other component of the vehicle, and not directly attached to the structure 24. The stationary shell portion 34 may be attached to the structure 24 in any suitable manner. For example, one or more bolts may be used to secure the stationary shell portion 34 to the structure 24.

Referring to FIGS. 5 and 6, a filter element 46 is attached to and supported by one of the moveable shell portion 32 or the stationary shell portion 34. As shown in the exemplary embodiment of the Figures, the filter element 46 is attached to and supported by the moveable shell portion 32. However, it should be appreciated that other embodiments of the air cleaner box assembly 22 may have the filter element 46 attached to and supported by the stationary shell portion 34. In the exemplary embodiment shown in the Figures and described herein, the filter element 46 is secured in place relative to the upper shell portion 38 and the middle shell portion 40. More specifically, in the exemplary embodiment shown in the Figures and described herein, a peripheral flange 48 of the filter element 46 is clamped in place between the upper shell portion 38 and the middle shell portion 40. The filter element 46 separates the un-filtered air chamber 44 and the filtered air chamber 36. As is known in the art, the filter element 46 is a device that filters particular matter from a flow of air passing through the filter element 46. The filter element 46 shown in the Figures and described herein is embodied as a flat filter. However, it should be appreciated that other embodiments of the air cleaner box assembly 22 may alternatively include a cylindrical filter or a conical filter. The specific details and the operation of the filter element 46 are not pertinent to the teachings of this disclosure, and are therefore not described in detail herein.

The filter element 46 includes a filter seal 50, disposed on the peripheral flange 48 of the filter element 46, between the upper shell portion 38 and the middle shell portion 40. The filter seal 50 is operable to seal the filtered air chamber 36 around a periphery of the filter element 46. The filter seal 50 may include any suitable type of seal, such as but not limited to, a rubber gasket, a urethane seal, or some other similar device capable of limiting infiltration of air, particularly heated air from the engine compartment 30, as well as other contaminants such as dust, dirt, debris and/or water. Additionally, the filter seal 50 prevents or limits air exfiltration out of the filtered air chamber 36.

Referring to FIGS. 1 and 2, an inlet duct 52 collects the flow of air and directs the flow of air into the un-filtered air chamber 44. The air entering the un-filtered air chamber 44 may be considered dirty air. The air passes through the filter element 46, and into the filtered air chamber 36, whereby the filter element 46 removes particulate matter from the flow of air. The air entering the filtered air chamber 36, through the filter element 46, may be considered clean air. The moveable shell portion 32 may include an outlet 54, which is connected to an outlet duct 55 that directs the flow of air from the filtered air chamber 36 to a destination, such as but not limited to, a throttle body, a turbocharger inlet, or a supercharger inlet, for combustion.

Referring to FIGS. 5 and 6, the moveable shell portion 32 is moveable relative to the stationary shell portion 34, along a path 56. The path 56 may include, but is not limited to, a generally linear path 56. The stationary shell portion 34 includes a stationary wall 58, which is generally parallel with the path 56 of the moveable shell portion 32. The stationary wall 58 of the stationary shell portion 34 defines an opening 60. The moveable shell portion 32 includes a central wall 62 that is at least partially positioned within the opening 60 of the stationary wall 58. The central wall 62 is generally parallel with the path 56 of the moveable shell portion 32, and generally parallel with the stationary wall 58. The central wall 62 includes a shape that generally mimics the stationary wall 58, but that is slightly smaller than the stationary wall 58 in order to fit within the opening 60 defined by the stationary wall 58. The central wall 62 slides within the opening 60 of the stationary wall 58, forming a generally telescopic connection between the central wall 62 and the stationary wall 58.

The air cleaner box assembly 22 includes a second chamber seal 64 that is disposed between the moveable shell portion 32 and the stationary shell portion 34. More specifically, the second chamber seal 64 is disposed between an exterior wall surface 90 of the central wall 62 of the moveable shell portion 32, and an interior wall surface 92 of the stationary wall 58 of the stationary shell portion 34. The second chamber seal 64 is operable to seal the un-filtered air chamber 44, between the moveable shell portion 32 and the stationary shell portion 34. The second chamber seal 64 limits infiltration of air, particularly heated air from the engine compartment 30, as well as other contaminants such as dust, dirt, debris and/or water. The second chamber seal 64 may include any device capable of sealing between the stationary wall 58 and the central wall 62, to prevent air and contaminate infiltration into the un-filtered air chamber 44 and/or air exfiltration out of the un-filtered air chamber 44, between the central wall 62 of the moveable shell portion 32 and the stationary wall 58 of the stationary shell portion 34. For example, the second chamber seal 64 may include a rubber gasket, or some other similar device. Because the central wall 62 of the moveable wall portion moves along the path 56 relative to the stationary wall 58 of the stationary shell portion 34, the second chamber seal 64 may include or be defined as a wiper seal, or other similar device. The second chamber seal 64 may be over-molded onto or otherwise attached to one of the stationary shell portion 34 or the moveable shell portion 32, in order to either move with the moveable shell portion 32, or remain stationary with the stationary shell portion 34, during relative movement between the moveable shell portion 32 and the stationary shell portion 34.

Referring to FIGS. 5 and 6, and as noted above, the moveable shell portion 32 moves along the path 56 relative to the stationary shell portion 34. The air cleaner box assembly 22 includes a plurality of guide members 66 for guiding the moveable shell portion 32 along the path 56. Each of the guide members 66 slideably connects the moveable shell portion 32 and the stationary shell portion 34 for guiding the moveable shell portion 32 along the path 56 relative to the stationary shell portion 34, between an expanded position shown in FIG. 5, and a compressed position shown in FIG. 6. The moveable shell portion 32 is moveable relative to the stationary shell portion 34 along the path 56 a maximum distance 68. Accordingly, the guide members 66 are configured to provide or allow the maximum distance 68 of movement between the moveable shell portion 32 and the stationary shell portion 34. In order to enable the moveable shell portion 32 to move or telescope into the opening 60 of the stationary shell portion 34, the stationary shell portion 34 includes a free space 70 that extends along the path 56. The free space 70 is a volume within the un-filtered air chamber 44 that that does not include any features that may interfere with the movement of the moveable shell portion 32, i.e., movement of the central wall 62 adjacent and next to the stationary wall 58 of the stationary shell portion 34. The free space 70 includes a length measured along the path 56 that is at least equal to or greater than the maximum distance 68 that the moveable shell portion 32 moves between the expanded position and the compressed position.

As noted above, in the exemplary embodiment shown in the Figures and described herein, the moveable shell portion 32 is connected to the stationary shell portion 34 via the plurality of guide members 66. However, in other embodiments, it should be appreciated that the air cleaner box assembly 22 may include only a single guide member 66. As such, it should be appreciated that the air cleaner box assembly 22 is not required to include a plurality of guide members 66, but may include any number of guide members 66, including but not limited to one, two, three, four or five guide members 66 for example.

Figure 7:
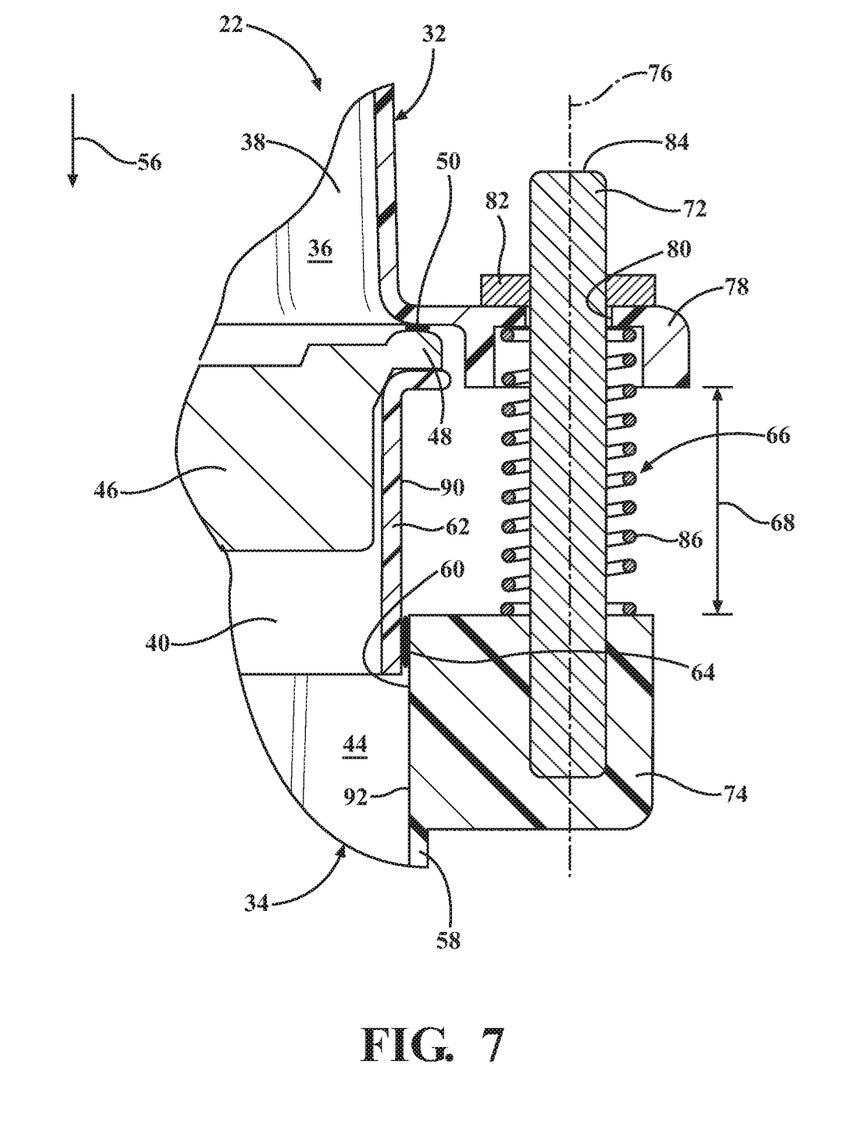
FIG. 7 is a schematic fragmentary cross sectional view of the air cleaner box showing a guide member.

Each of the plurality of guide members 66 are similarly constructed. Referring to FIG. 7, each of the guide members 66 includes a pin 72 that is fixedly attached to the stationary shell portion 34. The pin 72 may be attached to the stationary shell portion 34 in any suitable manner. For example, the pin 72 may be threaded into a respective boss 74 of the stationary shell portion 34, bonded to the stationary shell portion 34, integrally formed with the stationary shell portion 34, or attached to the stationary shell portion 34 in some other manner not shown or described herein. The pin 72 of each of the guide members 66 includes a central axis 76, which extends substantially parallel with the path 56 of the moveable shell portion 32.

The moveable shell portion 32 may include a tab 78 for each guide member 66, which defines a guide aperture 80 for a respective pin 72. The pin 72 of one of the guide members 66 extends through a respective one of the guide apertures 80. A nut 82, or other similar keeping device, is attached to a distal end 84 of each pin 72, to prevent the pin 72 from being dislodged from the guide aperture 80, and to secure the moveable shell portion 32 relative to the stationary shell portion 34. The nut 82 secures the moveable shell portion 32 relative to the stationary shell portion 34 to limit or prevent dislodgement of the shell portion 32 from becoming dislodged, for example, in response to an over-compression event in which the filtered air chamber 36 becomes overly pressurized.

Each of the guide members 66 includes a spring 86. The spring 86 biases the moveable shell portion 32 into the expanded position. The spring 86 yields in response to a force applied to the moveable shell portion 32 to allow movement of the moveable shell portion 32 along the path 56, toward the stationary shell portion 34, and into the compressed position. The spring 86 is an energy storing device that is capable of being compressed and automatically returning to an original or pre-compressed position. As shown in the Figures and described herein, the spring 86 in the exemplary embodiment of the guide member 66 is a coil spring 86 that is coiled around the pin 72, and disposed between a respective tab 78 of the moveable shell portion 32 and a respective boss 74 on the stationary shell portion 34. However, it should be appreciated that the spring 86 may include some other type of a restoring element, other than the exemplary coil spring 86, and that the spring 86 may be positioned other than shown and described herein. For example, the spring 86 may be embodied as a rubber or urethane bushing or pad, a foam bushing or pad, or some other energy storing device.

The spring 86 constant of the springs 86 of the guide members 66, as well as the number of guide members 66, determines the amount of force or the load required to move the moveable shell portion 32 toward the stationary shell portion 34. Accordingly, the load required to move the moveable shell portion 32 may be controlled by swapping the springs 86 in the guide members 66 with different springs 86 having a different spring 86 constant. For example, the load required to move the moveable shell portion 32 may be increased by using springs 86 in the guide members 66 that have a higher spring 86 constant. Similarly, the load required to move the moveable shell portion 32 may be decreased by using springs 86 in the guide members 66 that have a lesser spring 86 constant. Furthermore, the spring constants of the springs 86 for the different guide members 66 may also vary. Accordingly, some of the guide members 66 may include springs 86 having a first spring constant, and other guide members 66 may include springs 86 having a second spring constant that is different from the first spring constant. The spring constants of the springs 86 for the different guide members may be varied in order to prevent or limit binding of the moveable shell portion 32 along the path 56.

In operation, when a load of sufficient magnitude is applied to the top of the moveable shell portion 32, the load compresses the springs 86 of the guide members 66 and moves the moveable shell portion 32 over the pins 72 of the guide members 66 and along the path 56, from the expanded position into the compressed position. When the load is released, the springs 86 of the guide members 66 bias the moveable shell back into the expanded position. The free space 70 within the stationary shell portion 34 allows the moveable shell portion 32 to collapse or telescope into the un-filtered air chamber 44. The filter element 46, being secured to the moveable shell portion 32, between the upper shell portion 38 and the middle shell portion 40, travels with the moveable shell portion 32 and is undamaged as the moveable shell portion 32 travels along the path 56. This configuration allows the use of a standard sized filter element 46. Furthermore, because the moveable shell portion 32 easily collapses into the stationary shell portion 34, the top surface 39 of the upper shell portion 38 may be positioned very near the hood 28, when in the expanded position, without interfering with a crumple zone of the hood 28, because the moveable shell portion 32 may be displaced into the compressed position by the hood 28 as the hood 28 crumples in response to an applied load.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An air cleaner box assembly comprising:
   a moveable shell portion defining a first air chamber;
   a stationary shell portion defining a second air chamber;
   a filter element attached to and supported by one of the moveable shell portion or the stationary shell portion, and separating the first air chamber and the second air chamber; and
   a guide member slideably connecting the moveable shell portion and the stationary shell portion for guiding the moveable shell portion along a path relative to the stationary shell portion, between an expanded position and a compressed position;
   wherein the moveable shell portion is moveable relative to the stationary shell portion a maximum distance along the path, and wherein the stationary shell portion provides a free space along the path that does not interfere with the movement of the moveable shell portion.

2. The air cleaner box assembly set forth in claim 1, wherein the guide member includes a spring biasing the moveable shell portion into the expanded position, and wherein the spring yields in response to a force applied to the moveable shell portion to allow movement of the moveable shell portion along the path toward the stationary shell portion and into the compressed position.

3. The air cleaner box assembly set forth in claim 2, wherein the guide member includes a pin fixedly attached to the stationary shell portion, and wherein the pin includes a central axis extending substantially parallel with the path of the moveable shell portion.

4. The air cleaner box assembly set forth in claim 3, wherein the spring is a coil spring coiled around the pin.

5. The air cleaner box assembly set forth in claim 4, wherein the spring is disposed between the moveable shell portion and the stationary shell portion.

6. The air cleaner box assembly set forth in claim 5, wherein the guide member includes a nut attached to the pin and securing the moveable shell portion relative to the pin.

7. The air cleaner box assembly set forth in claim 1, wherein the moveable shell portion includes a first shell portion and a second shell portion removeably attached to the first shell portion.

8. The air cleaner box assembly set forth in claim 7, wherein the filter element is secured in place relative to both the first shell portion and the second shell portion.

9. The air cleaner box assembly set forth in claim 7, further comprising a plurality of fasteners interconnecting the first shell portion and the second shell portion.

10. The air cleaner box assembly set forth in claim 7, wherein the filter element includes a filter seal disposed between the first shell portion and the second shell portion for sealing the first air chamber around a periphery of the filter element.

11. The air cleaner box assembly set forth in claim 1, wherein the first air chamber is a filtered air chamber, and the second air chamber is an un-filtered air chamber.

12. The air cleaner box assembly set forth in claim 1, wherein the stationary shell portion includes a stationary wall extending along the path and defining an opening.

13. The air cleaner box assembly set forth in claim 12, wherein the moveable shell portion includes a central wall at least partially positioned within the opening of the stationary wall, such that the central wall slides within the opening of the stationary wall.

14. The air cleaner box assembly set forth in claim 13, further comprising a second chamber seal disposed between the moveable shell portion and the stationary shell portion for sealing the second air chamber between the moveable shell portion and the stationary shell portion.

15. The air cleaner box assembly set forth in claim 14, wherein the second chamber seal is disposed between the central wall of the moveable shell portion and the stationary wall of the stationary shell portion.

16. A vehicle comprising:
   a structure having a hood and defining an engine compartment; and
   an air cleaner box assembly attached to the structure and disposed within the engine compartment, the air cleaner box assembly including:
      a moveable shell portion having an upper surface disposed adjacent the hood, and defining a filtered air chamber;
      a stationary shell portion attached to the structure and defining an unfiltered air chamber;
      a filter element attached to and supported by the moveable shell portion, and separating the filtered air chamber and the un-filtered air chamber; and
      a plurality of guide members, with each of the plurality of guide members slideably connecting the moveable shell portion and the stationary shell portion for guiding the moveable shell portion along a path relative to the stationary shell portion, between an expanded position, and a compressed position;
      wherein the moveable shell portion is moveable relative to the stationary shell portion a maximum distance along the path, and wherein the stationary shell portion provides a free space along the path that does not interfere with the movement of the moveable shell portion.

17. The vehicle set forth in claim 16, wherein each of the plurality of guide members include a pin fixedly attached to the stationary shell portion, and include a central axis extending substantially parallel with the path of the moveable shell portion.

18. The vehicle set forth in claim 16, wherein the moveable shell portion includes a first shell portion and a second shell portion removeably attached to the first shell portion, with the filter element clamped in place between the first shell portion and the second shell portion.

19. A vehicle comprising:
- a structure having a hood and defining an engine compartment; and
- an air cleaner box assembly attached to the structure and disposed within the engine compartment, the air cleaner box assembly including:
  - a moveable shell portion having an upper surface disposed adjacent the hood, and defining a filtered air chamber;
  - a stationary shell portion attached to the structure and defining an unfiltered air chamber;
  - a filter element attached to and supported by the moveable shell portion, and separating the filtered air chamber and the un-filtered air chamber;
  - a plurality of guide members, with each of the plurality of guide members slideably connecting the moveable shell portion and the stationary shell portion for guiding the moveable shell portion along a path relative to the stationary shell portion, between an expanded position and a compressed position;
- wherein each of the plurality of guide members include a pin fixedly attached to the stationary shell portion, and include a central axis extending substantially parallel with the path of the moveable shell portion; and
- wherein each of the plurality of guide members include a spring coiled around the pin and disposed between the moveable shell portion and the stationary shell portion, wherein the spring of each of the plurality of guide members bias the moveable shell portion into the expanded position, and yields in response to a force applied to the moveable shell portion to allow movement of the moveable shell portion along the path toward the stationary shell portion and into the compressed position.

\* \* \* \* \*